A. S. KROTZ.
PLANTING MACHINE.
APPLICATION FILED JAN. 14, 1918.

1,397,689.

Patented Nov. 22, 1921.
6 SHEETS—SHEET 1.

A. S. KROTZ.
PLANTING MACHINE.
APPLICATION FILED JAN. 14, 1918.

1,397,689.

Patented Nov. 22, 1921
6 SHEETS—SHEET 4.

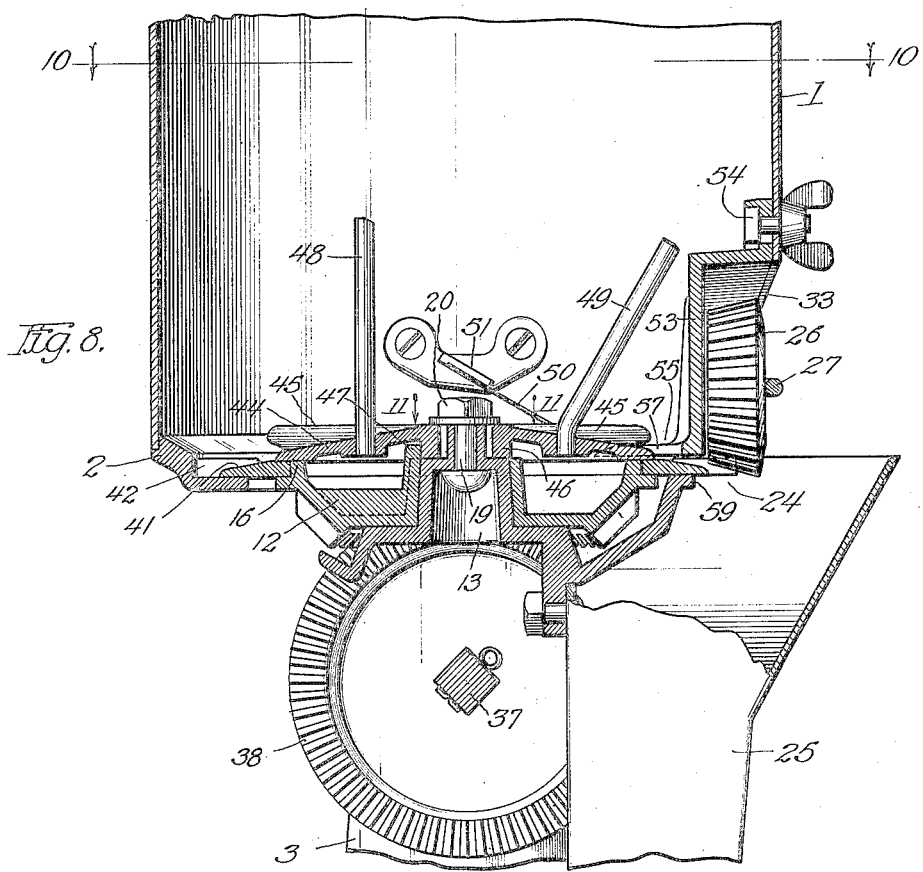
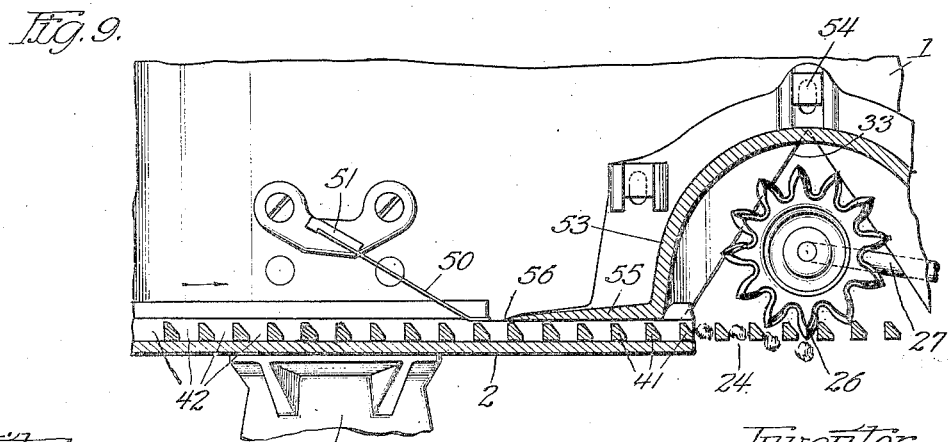

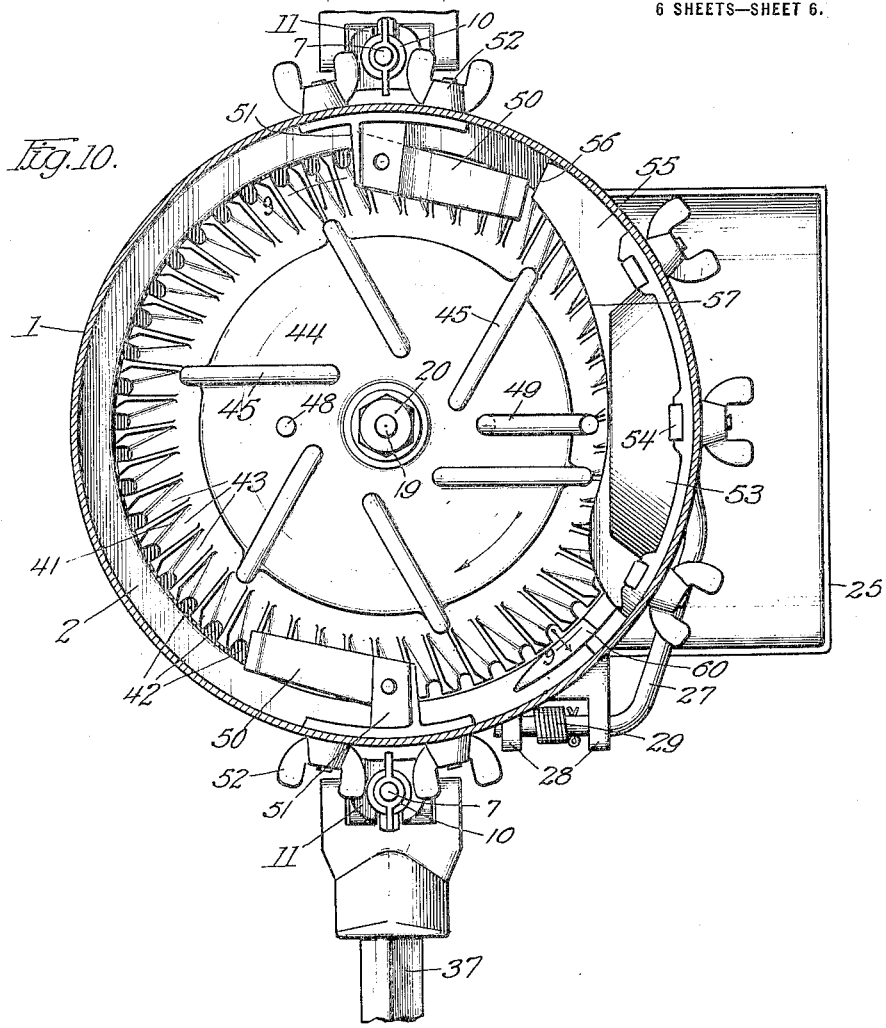

UNITED STATES PATENT OFFICE.

ALVARO S. KROTZ, OF JANESVILLE, WISCONSIN, ASSIGNOR TO THE JANESVILLE MACHINE COMPANY, OF JANESVILLE, WISCONSIN, A CORPORATION OF WISCONSIN.

PLANTING-MACHINE.

1,397,689.  Specification of Letters Patent.  Patented Nov. 22, 1921.

Application filed January 14, 1918. Serial No. 211,754.

*To all whom it may concern:*

Be it known that I, ALVARO S. KROTZ, a citizen of the United States of America, and resident of Janesville, county of Rock, and State of Wisconsin, have invented a certain new and useful Improvement in Planting-Machines, of which the following is a specification.

This invention relates to planting machines of that kind in which the seed is held in a hopper ordinarily called the seed-can and in which rotary mechanism is provided at the bottom of this receptacle for dropping the corn or peanuts or cotton-seed, or any other seed, one by one, or two by two, or as many at a time as may be necessary, in any suitable manner, into a tube or hollow member extending downward to the heel of the runner, or behind the plow, of the planting-machine upon which the dropping-mechanism is employed.

Generally stated, the object of the invention is to provide a novel and improved seed-dropping-mechanism of the foregoing general character.

A special object is to provide an improved construction and arrangement whereby the seed-can and the dropping-mechanism are separable, whereby the can or receptacle may be detached and lifted upward from the mechanism, so that the can may be emptied when such is desirable or necessary, and whereby one seed-plate or ring may be substituted for another, when the seed is to be changed, in an easy and convenient manner.

It is also an object to provide certain details and features of construction and combinations tending to increase the general efficiency and desirability of a seed-dropping-mechanism of this particular construction.

To the foregoing and other useful ends, the invention consists in matters hereinafter set forth and claimed.

In the accompanying drawings:—

Fig. 8 is a view similar to Fig. 5, but showing another form of seed-plate, and another form of stripper, the mechanism of Fig. 8 being adapted for dropping cotton-seed, whereas the construction shown in all of the previous figures is intended for the planting of peanuts or the like.

Fig. 9 is a detail section to show the arrangement of certain elements shown in Fig. 10.

Fig. 10 is a horizontal section on line 10—10 in Fig. 8.

Fig. 11 is a detail section on line 11—11 in Fig. 8.

Fig. 12 is a similar section on line 12—12 in Fig. 5.

Figure 1:
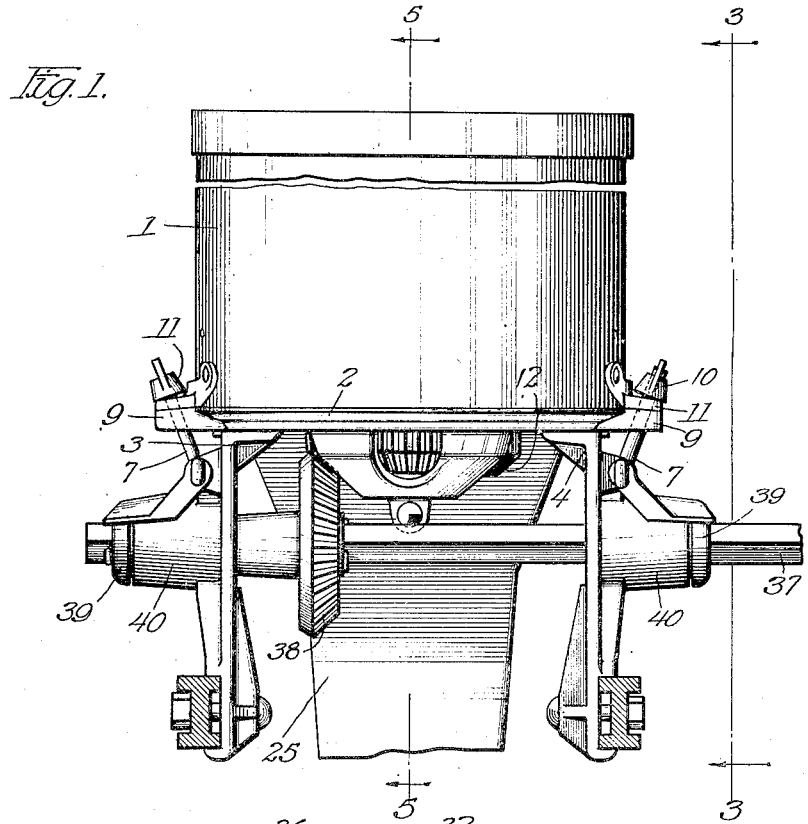
Figure 1 is a front elevation of a seed-dropping-mechanism embodying the principles of the invention, showing the seed-can or receptacle broken away between the top and bottom thereof for convenience of illustration.
Figure 2:
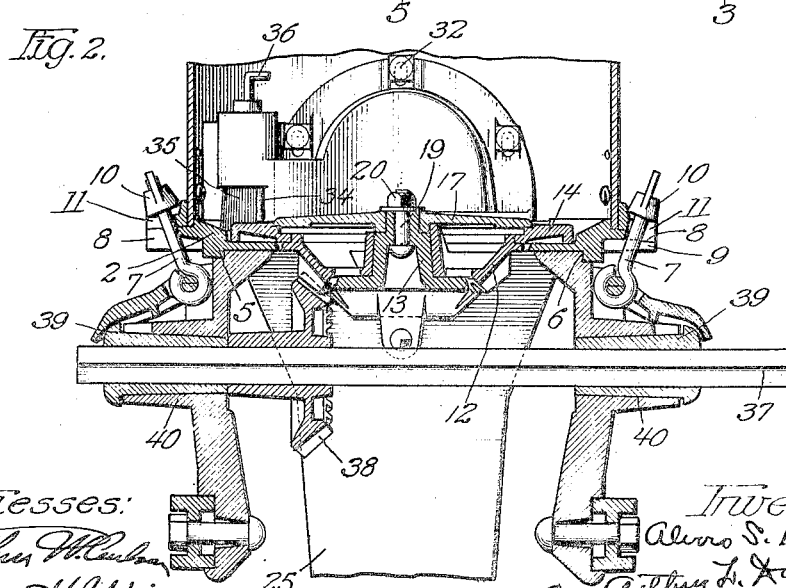
Fig. 2 is a vertical section on line 2—2 in Fig. 3.
Figure 3:
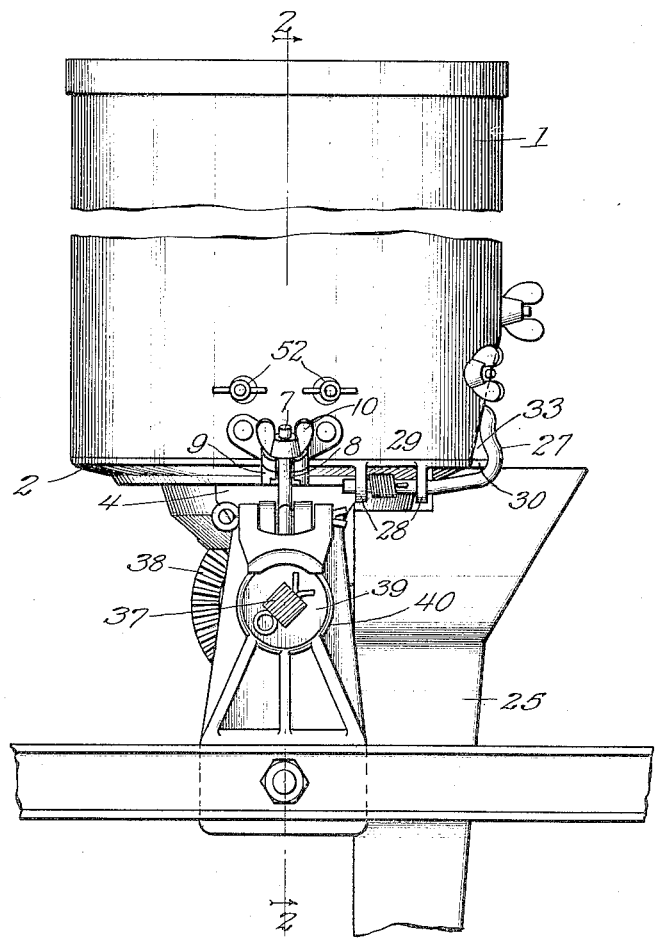
Fig. 3 is a vertical section on line 3—3 in Fig. 1.
Figure 4:
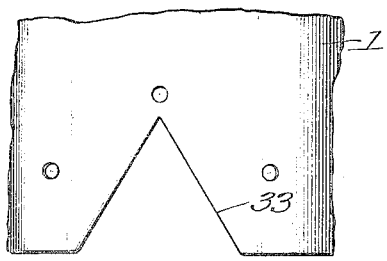
Fig. 4 is an enlarged fragmentary or detail view of a portion of the seed-can or receptacle.
Figure 5:
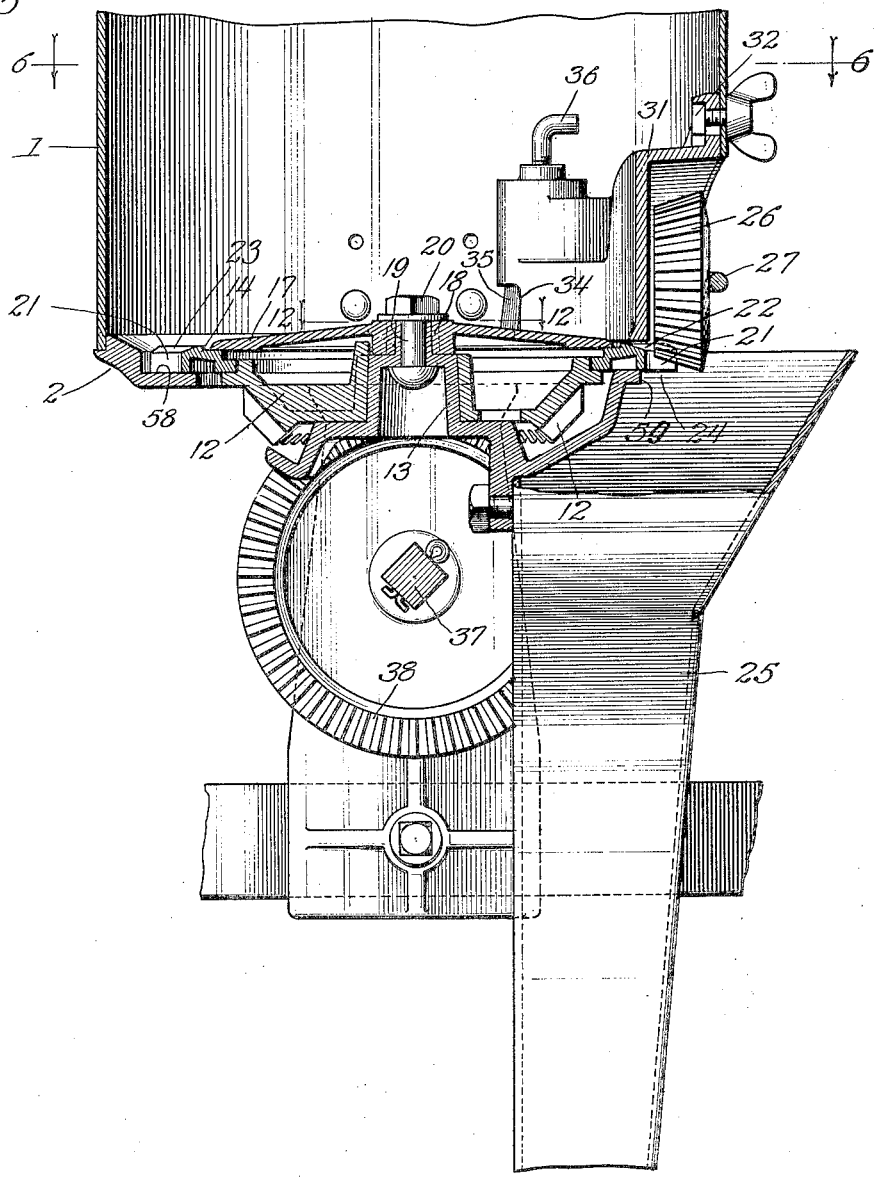
Fig. 5 is an enlarged vertical section on line 5—5 in Fig. 1.

As thus illustrated, the invention comprises a seed-can or receptacle 1 provided with a bottom or base-plate or casting 2 suitably fitted in the bottom thereof in any desired manner. The stationary brackets 3 and 4 are provided with upper portions which engage the seats 5 and 6 formed on the under-side of the bottom of the seed-can, so that the latter cannot rotate, and these brackets are also provided with pivoted eye-bolts 7 arranged in position to swing upward and into the slots 8 of the projecting portions 9 at opposite sides of the base 2 of the receptacle. Thumb-nuts 10 are applied to these eye-bolts, and when in operative position these nuts bear upon the projecting portions 11 on the base of the seed-can, which are slotted to receive the bolts, and which in turn bear downward upon the projecting portions 9 of the base. Thus, by removing the nuts 10, the can or receptacle 1 may be lifted upward from the base 2, or the can and the base may be lifted upward together, inasmuch as these bolts and nuts serve not only to hold the can and base together, but serve also to hold both of these elements properly seated on the brackets or posts 3 and 4 of the body-frame of the planting-machine.

The dropping-mechanism comprises a bevel-gear 12 which is inserted and seated downwardly in the base-plate or casting 2, upon the stationary or fixed and upstanding boss 13, and which is held in place by the rotary seed-plate or ring 14, which latter is provided around its inner edge with spaced lugs 15 adapted to engage the upstanding lugs 16 on the top of the bevel-gear, so that rotation of the bevel-gear will rotate the seed-plate or ring 14 in the desired direction and manner.

Figure 6:
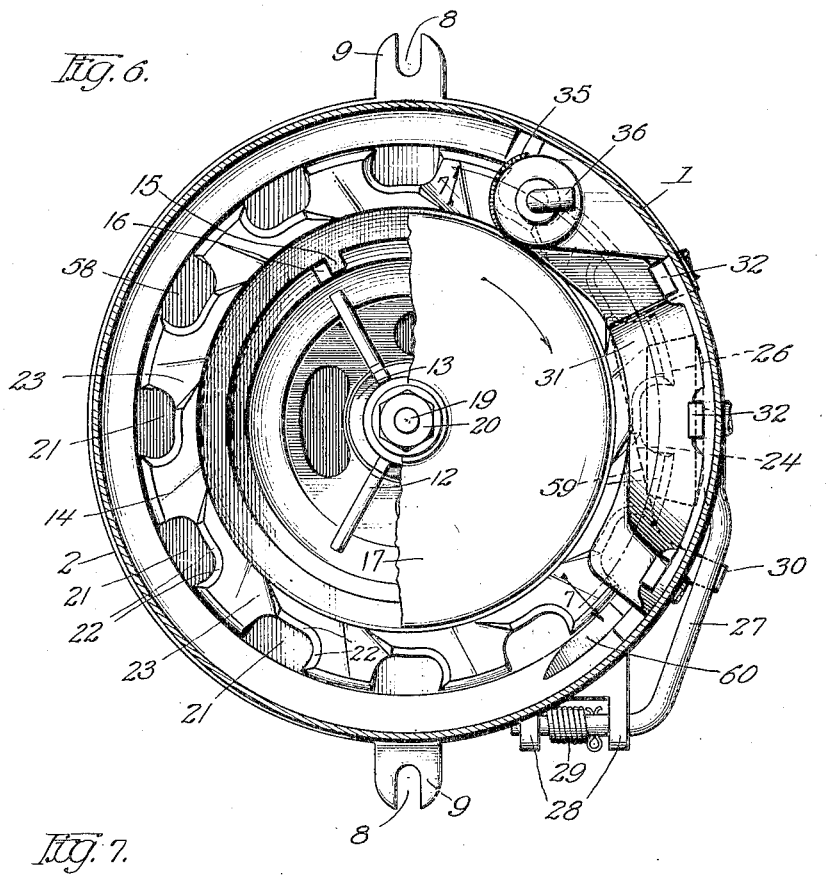
Fig. 6 is a horizontal section on line 6—6 in Fig. 5.
Figure 7:
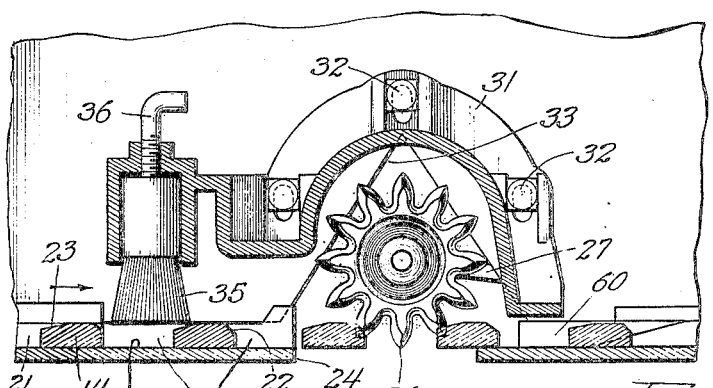
Fig. 7 is a detail vertical section on line 7—7 in Fig. 6.

A cap-plate 17 is mounted on the upper end of the boss 13, and provided at its hub with portions 18 which engage small grooves in the top of said boss, whereby this cover-plate 17 is held against rotation. A bolt 19 is inserted upwardly through the boss 13, and has its upper end provided with a nut and washer 20 to hold the cap-plate 17 down in position. The boss 13, as shown, is simply a post which is rigid with the frame or some stationary portion of the machine. This seed-plate or ring 14 may be of any suitable form or character, but as a matter of further improvement is provided at its outer edge with cells 21 which have their inner and rear edges beveled at 22, and which have wide shallow grooves 23 leading to said cells, these grooves being tangentially arranged, and each groove being adapted to deliver the seed to the front end of its allotted cell. The cells 21 are oblong and have rounded inner corners, and are of a size to hold the required number of peanuts or other seeds. It will also be seen that the base or bottom 2 of the seed-holding receptacle 1 is provided at one side with an elongated opening 24 through which the seed is dropped into the tube or hollow member 25, of the usual or any suitable character, which leads downward to the heel of the runner or to a point behind the plow, depending upon the particular type of planting-machine upon which the seed-dropping-mechanism is employed. As the plate or ring 14 is rotated, in the direction indicated by the arrow in Fig. 6, the peanuts or other seeds are carried around by the cells 21 until they drop through the opening 24 into the tube or hollow member 25, and to insure this dropping action a cog-wheel 26 is mounted upon the end of the arm 27, which latter has its bent end portion mounted to rotate in bearings 28 on the base of the receptacle, and provided with a spring 29 which tends to keep this arm pressed downward against the stop 30 on said base. The cogs of this wheel 26 enter the cells 21 and push the seed downward, and the spring 29 permits the wheel 26 to rise whenever the conditions are such that this is necessary or desirable. A bracket or casting 31 is adjustably secured by bolts 32 to the inside of the can or receptacle, to form a recess immediately inside of the notch 33 for the cog-wheel 26 to occupy, and the lower edge of this bracket or casting 31 sets down close to the top surface of the rotary seed-plate or ring 14, being provided at the front end thereof, however, with an opening 34 to expose the front side of the brush 35 that acts as a stripper or wiper to keep the surplus seed back from the discharge opening, whereby only the desired number of seeds remain in each cell after passing under said brush on their way to said discharge opening. This brush is adjustable by rotating the screw 36 at the top thereof, or in any other suitable or desired manner, so that the brush will bear with the required or proper pressure upon the top of the rotary seed-plate, thus brushing back the volume of seed and allowing only a certain number to remain in each of the cells 21 as the latter travel around toward the discharge opening. The inner wall of the casting of stripper-plate 31 has its lower edge, as previously stated, disposed at the top surface of the seed-plate and is adjustable up and down by means of the bolts 32 which extend through slots in said plate 31, thus allowing the latter to be moved up and down and then rigidly secured in adjusted position. Consequently, no seed can finally reach the discharge opening 24 except that which enters the cells and passes under the brush 35 when the mechanism is in operation. Everything is in plain view, and is susceptible of adjustment in a convenient and easy manner, so that the desired results are rendered more certain of attainment.

The brackets or posts 3 and 4 support the rotary operating shaft 37 which is of any suitable known or approved character, being provided with a bevel pinion 38 to engage the bevel-gear 12, whereby rotation of the said shaft will rotate the rotary seed-dropping-mechanism. Preferably, as shown, the shaft 37 is squared and provided with sleeves 39 which rotate in the bearings 40, and the pinion 38 fits the square shaft and is readily removable therefrom.

For planting other seed, such as cotton, the construction is interchangeable or convertible, so that a construction of the kind shown in Figs. 8 to 11 inclusive is obtainable whenever desired. This is done by substituting for the previously described rotary seed-plate another seed-plate 41 of the kind shown in Figs. 8 and 10. This seed-plate for dropping cotton-seed, or the like, has its outer edge provided with cells 42 to which the tangential grooves 43 lead, these grooves being formed by upstanding tangential ridges, whereby the seeds are delivered to the inner sides of said cells. Also, the previously described cap-plate is taken off, and in its place the cap-plate 44 is inserted, this latter cap-plate having tangential top ribs 45 which sweep around in the bottom of the mass of seed and gradually work the same out to the cells of the rotary seed-plate. For this purpose, the cap-plate or cover-plate 44 is provided with lugs 46 which extend downward to engage the lugs 47 on the upper end of the hub of the bevel-gear 12, whereby the said cover or cap-plate will rotate in unison with said bevel-gear and the rotary seed - plate. Furthermore, this cover or cap-plate 44 is preferably provided with an upstanding post 48 and an inclined post 49, these two posts serving to agitate and stir the seed in the bottom portion of the can or receptacle, so that the seed will not become clogged, thus insuring greater certainty in the downward feeding of the seed from the receptacle into the cells of the rotary seed-plate. Again, flat springs 50 are positioned to press upon the cellular and grooved outer top surface of the seed-ring 41, these springs being mounted on brackets 51, which are held in place by thumb-nuts 52 applied to short screws which extend through holes in the side walls of the can or receptacle. These springs press the cotton or other seed downward into the cells of the rotary-seed-plate. Furthermore, for the purpose of planting cotton or other similar seed, another form of stripper or wiper is employed in place of the one previously described, and this second form of stripper or wiper consists of a body-plate or casting 53 which, like the one previously described, forms a recess or chamber for the cog-wheel 26, and which, like said other plate, is adjustably supported in position by nuts 54 on bolts extending through slots in said brackets or casting, whereby this stripper is adjustable up and down. The front end of the casting or stripper-plate 53 has a lower portion 55 that extends forward to meet the on-coming cotton-seed in the cells of the seed-plate. It will be seen that this portion 55 is of such shape that it has an inclined top surface which slopes downward to the angular end edge 56 thereof, which latter deflects the surplus seed away from the cells which pass under and then travel on to the discharge opening. Also, this forwardly reaching portion 55 has an inner edge 57 which extends practically at an angle in such a manner that it deflects the surplus seed away from the grooves 43 and toward the center of the rotary seed - dropping mechanism. In this way, only one seed occupies each cell 42 of the rotary seed-plate and the seed-dropping operation is of the required or desired character. Preferably, one of the springs 50 bears upon the rotary seed-plate 41 just ahead of the front end of the portion 55 of the stripper, thus forcing the seeds down into the cells immediately before they pass under said stripper.

In either form of the invention, however, the seed in the cells of the rotary seed-plate travel around in the groove 58 formed in the base 2 of the receptacle, and eventually the seeds in the cells pass under the stripper and then encounter the angular inner edge 59 of the discharge opening 24 formed in said base. This edge 59 serves, therefore, to gradually deflect the seeds outward and away from the center of rotation of the mechanism, toward the outer edge of the base of the receptacle. In this way, if the seeds are jammed in the cells, but hang down a little below the edge of the rotary seed-plate, the angular edge 59 of the discharge opening will strike the seeds and push them outward from the cells. With this angular arrangement of the edge 59 of the discharge opening, it is practically impossible for any seed to be cut in two between the can or receptacle-bottom and the edge of the cell in the rotary seed-plate. Also, it will be seen that any seed which is not thus released from the cells in the rotary-plate will enter the groove or opening 60 formed in the base of the receptacle, and through which groove the seeds will travel out from under the stripper-plate or casting and back into the interior of the can or receptacle.

With the construction shown and described, the post formed by the boss 13 is stationary, of course, being supported by the frame of the machine in any suitable or desired manner, and by removing the nut 20 the cover plate 17 can then be removed, thereby permitting the rotary seed plate of the ring 14, as well as the bevel gear 12, to be removed upwardly while the base 2 remains seated upon the tops of the two brackets; and this is also true, of course, of the construction shown in the other views. In this way, the base can rest in position, with the receptacle removed therefrom, for convenience in changing seed plates.

What I claim as my invention is:—

1. A planting machine having a seed dropping device comprising a receptacle for the seed, a base for said receptacle, supporting means for said base, seed dropping mechanism on said base, a stationary center post having means for removably retaining said mechanism and base in position, means outside of the receptacle to detachably retain said base in position on said supporting means, whereby said receptacle and base and mechanism can be readily lifted from the machine, and a bevel gear on said post to operate said mechanism.

2. A structure as specified in claim 1, said receptacle and base being separable from each other, and said mechanism comprising a rotary seed-plate which is removable upwardly when the receptacle is removed and while said base remains in position on the machine.

3. A structure as specified in claim 1, said outside retaining means comprising fastening devices which also serve to removably hold said receptacle on said base.

4. A structure as specified in claim 1, said supporting means comprising a pair of brackets, eye-bolts pivoted on the upper ends of said brackets, said receptacle and base being provided with projections having notches to receive said bolts, and nuts on said bolts to clamp the receptacle on the base, and to thereby clamp the receptacle and the base upon the upper ends of said brackets.

5. In a planting machine, a seed-receptacle, seed dropping mechanism at the bottom of said receptacle, a stripper disposed over said mechanism at one side of the said receptacle, and fastening means extending through the side wall of the receptacle and having provisions whereby said stripper is adjustable up and down in accordance with the requirements of the seed being planted.

6. A structure as specified in claim 5, said stripper having a recess forming a cavity, and said receptacle having an opening opposite said cavity, rotary means in said cavity opposite said opening to detach the seed from said mechanism, and an arm outside of the receptacle to support said rotary means.

7. In a planting machine, a seed dropping mechanism, a seed receptacle, a stripper disposed over said mechanism and suitably secured to said receptacle, said stripper having a recess forming a cavity therein, and means supported independently of said stripper and disposed in said cavity to detach the seed from said mechanism.

8. In a planting machine, a seed dropping mechanism comprising a bevel gear disposed in position to rotate about a vertical axis, means to rotate said gear, a rotary seed-plate in the form of a ring operatively connected to be rotated by said gear, a stationary upright portion forming a fixed post upon which said gear rotates, a cover plate secured to the top of said upright portion and extending over said bevel gear and overhanging said ring, so that said cover plate holds said ring and gear against upward removal, said cover plate forming a support for the seed and being removable from the upper end of said post to permit upward removal of said ring and gear from said mechanism, and means to removably retain said cover plate on the upper end of said post.

9. A structure as specified in claim 8, said cover-plate being rotatable on the upper end of said post in unison with said bevel-gear, and means on said cover-plate to agitate and stir the seed.

10. A structure as specified in claim 8, the top of said cover-plate being provided with ribs which are tangential to said post and which project over said ring.

11. A structure as specified in claim 8, said ring encircling said gear and having notches in the outer edge thereof, and having tangential grooves in its upper surface leading to said notches.

12. A structure as specified in claim 8, and one or more stationary springs secured to the receptacle and disposed in position to bear downward upon said ring adjacent the outer edge of the said cover-plate.

13. In a planting machine, a seed receptacle, a base for said receptacle, a rotary seed dropping ring therein, said base having a discharge opening adjacent one side of the receptacle, a stripper in the form of a casting secured to the side wall of said receptacle to cover said discharge opening, said stripper being formed with a projecting end which extends over the ring and having a lower edge disposed close to the top of said ring to exclude the seed all around except at said projecting end where the seed passes under the ring, means to prevent the ring from rising against the stripper, and means whereby said stripper is adjustable up and down bodily, said base having a seed escape groove leading from under the rear end of said stripper, and said discharge opening having an angular edge to force the seed outwardly from said ring, whereby any seed that does not fall through said opening will pass through said groove and back into said receptacle, substantially as shown and described.

14. In seed-dropping-mechanism, a seed-receptacle, a base therefor and a rotary seed-plate in the form of a ring-mounted to rotate in said base, means to rotate said ring, said base having a discharge opening at one side of said receptacle, and means to cover said opening, said base having a groove through which any seed which does not fall through said opening may return into said receptacle.

15. A planting machine comprising a rotary seed plate formed with teeth along the outer edge thereof to provide cells to carry the seed, a receptacle having a base to support said seed plate, said base having a discharge opening at one side of said receptacle to expose the cells on the under side of said seed plate, so that the seed may drop downward, a stationary member forming a stripper disposed over said seed plate to cover said opening and formed with an inner edge which starts at the outer edge of the seed plate and curves gradually inward and in the direction of travel of said teeth to deflect the surplus seed away from the cells approaching said opening.

16. A structure as specified in claim 15, said seed-plate being beveled around its upper surface inside of the cells, so that the top surface of the ring slopes downward to said cells, and the tops of said teeth extending over onto said bevel to form straight tangential ribs alternating with grooves leading to said cells.

17. A structure as specified in claim 15, in which said discharge opening has an inner edge disposed at an angle to gradually deflect the seeds out of said cells.

18. A structure as specified in claim 15, said receptacle having an opening in the side thereof opposite said stripper and over said discharge opening to expose said teeth.

19. A structure as specified in claim 15, and means whereby said member is adjustable up and down bodily on the side wall of the receptacle.

20. A structure as specified in claim 15, said base having a groove extending from said discharge opening to permit undropped seed to travel back into the receptacle.

21. In seed-dropping mechanism, a rotary seed plate provided with openings (42) in the outer edge thereof, having tangentially arranged straight grooves (43) leading to said openings, with straight tangentially arranged ribs between said grooves, substantially as shown and described.

22. In seed-dropping mechanism, the combination of a stationary fixed post, a bevel gear mounted to rotate on said post, a horizontal shaft having a bevel pinion to engage said bevel gear, brackets provided with bearings for said shaft, a base in the form of a ring removably mounted on the tops of said brackets, a receptacle detachably mounted on said base, devices on said brackets to clamp the receptacle and base together upon said brackets, a rotary seed plate resting on said base, means on said bevel gear to engage and rotate said seed plate, a cover plate supported by and engaging the top of said post and disposed over the bevel gear and extending a distance over the rotary seed plate, and means on the top of said post to removably hold said cover plate in position thereon, the seed plate and the bevel gear being removable upwardly from the base when said cover plate is removed.

Signed by me at Janesville, Rock County, Wisconsin, this 26th day of December, 1917.

ALVARO S. KROTZ.

Witnesses:
F. H. FARNSWORTH.
ETHEL BOOKOUT.